United States Patent Office 3,591,635
Patented July 6, 1971

3,591,635
CATALYTIC HYDROGENATION PROCESS FOR PREPARING DI(4 - AMINOCYCLOHEXYL) METHANE
William J. Farrissey, Jr., North Branford, and Fioro F. Frulla, Wallingford, Conn., assignors to The Upjohn Company, Kalamazoo, Mich.
No Drawing. Filed Sept. 25, 1968, Ser. No. 762,661
Int. Cl. C07c 85/00
U.S. Cl. 260—563B                                    12 Claims

ABSTRACT OF THE DISCLOSURE

A process is disclosed for the catalytic hydrogenation of di(4-aminophenyl)methane to di(4-aminocyclohexyl) methane. The novelty resides in use of a supported rhodium catalyst (rhodium-on-alumina preferred) with a rhodium content of about 1% to about 20% by weight. High yields of di(4-aminocyclohexyl)methane, free from aromatic contaminants, are obtained. The catalyst can be recycled many times without exhaustion.

BACKGROUND OF THE INVENTION (1) Field of the invention

This invention relates to the catalytic hydrogenation of polynuclear aromatic amines to the corresponding poly(cycloalkyl)amines and is more particularly concerned with the catalytic hydrogenation of di(4-aminophenyl)methane to di(4-aminocyclohexyl)methane using a supported rhodium catalyst.

(2) Description of the prior art

The catalytic hydrogenation of the nucleus of aromatic amines is well-known in the art. The process most commonly used at present in the catalytic hydrogenation of di(4 - aminophenyl)methane to di(4 - aminocyclohexyl) methane involves the use of supported and unsupported ruthenium catalysts; see, for example, U.S. Pats. 2,494,-563, 2,606,924, and 2,606,928. This process is subject to a number of disadvantages.

Firstly, while the hydrogenation of the first of the two phenyl nuclei in the starting amine proceeds rapidly, the hydrogenation of the second of the two phenyl nuclei proceeds much more slowly. Consequently prolonged reaction times are required. Further, even after very prolonged hydrogenation there is still generally present in the reaction product a trace of unreduced aromatic content which latter is potentially undesirable for certain contemplated uses of the fully hydrogenated diamine.

Secondly, the ruthenium catalyst is generally not capable of re-use without a drastic recovery and rejuvenation procedure.

We have now found that the above disadvantages are overcome, and excellent yields of di-(4-aminocyclohexyl) methane are obtained, by carrying out the hydrogenation of di(4-aminophenyl)methane in the presence of a supported rhodium catalyst. Not only does the hydrogenation, particularly the hydrogenation of the second of the two phenyl nuclei, proceed much faster, but the catalyst can be re-used, without complex rejuvenation treatment, a considerable number of times. These findings represent a considerable saving in cost of production of di(4-aminocyclohexyl)methane which is a highly important monomer employed, inter alia, in the synthesis of polyamides of the nylon family.

The use of supported rhodium catalysts in the ring hydrogenation of aromatic amines such as aniline is known in the art; see, for example, U.S. Pat. 3,196,-179. However the use of this class of catalysts in the hydrogenation of di(4-aminophenyl)methane has not previously been described.

SUMMARY OF THE INVENTION

The invention consists in an improved process for the catalytic hydrogenation of di(4-aminophenyl)methane to di(4-aminocyclohexyl)methane wherein the improvement comprises employing a supported rhodium catalyst.

In a particular embodiment the invention also includes a semi-continuous process for the catalytic hydrogenation of di(4-aminophenyl)methane to di(4-aminocyclohexyl)methane using the same batch of supported rhodium catalyst a plurality of times.

DETAILED DESCRIPTION OF THE INVENTION

The catalyst employed in the process of the invention is one containing elemental rhodium supported on any of the carriers conventionally employed for this purpose in preparing hydrogenation catalysts. Examples of such carriers are alumina, carbon, kieselguhr, bentonite, asbestos, silica gel, zirconium oxide and the like. The preferred carrier employed in the process of the invention is alumina.

The amount of elemental rhodium present in the catalyst employed in the process of the invention can vary from about 0.05 to about 40 percent by weight but is preferably within the range of about 1 to about 20 percent by weight. Most preferably the amount of elemental rhodium present in the catalyst is within the range of about 2 percent to about 10 percent by weight.

The supported rhodium catalyst employed in the process of the invention is prepared in accordance with procedures well-known in the art. For example, a suspension of the desired carrier in an aqueous solution of a soluble rhodium salt, such as rhodium chloride trihydrate, is treated with base to deposit the rhodium hydroxide on the support. When this is shaken in an atmosphere of hydrogen, the rhodium salt is reduced to the elemental state on the carrier. The preparation of the catalyst in this manner can be carried out as a separate operation or can be incorporated as a preliminary step in the process of the invention. For example the catalyst can be prepared in the above manner in the hydrogenation vessel to be used in the process of the invention and said catalyst then merely requires washing with water prior to addition of the charge to be hydrogenated.

Alternatively, since many of the supported rhodium catalysts employed in the process of the invention are readily available, in prepared form, from commercial sources the actual preparation of the catalyst as a preliminary step in the process can be avoided if desired.

In carrying out the process of the invention the procedures commonly used in the art to carry out catalytic hydrogenations are employed, the only novel feature being the use of the supported rhodium catalyst in the hydrogenation of this particular diamine. The diamine can be employed in the form of the free base or in the form of an acid addition salt such as the dihydrochloride, sulfate, phosphate and the like. The hydrogenation is carried out in the presence of an inert solvent, i.e. a solvent for the diamine, free base or acid addition salt, which does not interfere in any way with the desired course of the hydrogenation. Preferably the solvent employed is a loweralkanol, i.e. an alkanol containing from 1 to 8 carbon atoms, inclusive, such as methanol, ethanol, propanol, butanol, pentanol, hexanol, heptanol, octanol and isomeric forms thereof. If desired, the alkanol can contain a minor proportion, up to about 50 percent by volume, of water. The most preferred solvent employed is advantageously such that the concentration of starting diamine in the reaction mixture is from about 5% to about 50% by weight. Preferably the concentration of starting diamine in the reaction mixture is from about 10% to about 25% by weight.

The catalyst is suspended in a solution of the starting diamine, in the form of free base or acid addition salt, and the resulting suspension is subjected to hydrogenation in an appropriate hydrogenation vessel. The amount of catalyst employed is such that the amount of rhodium present in the reaction mixture is within the range of about 0.1 to about 3% by weight based on the amount of starting diamine (calculated as free base) present in the reaction mixture. Preferably the quantity of catalyst employed is such that the amount of rhodium present in the reaction mixture is within the range of about 0.5 to about 2% by weight based on the amount of starting diamine (calculated as free base) employed.

The hydrogenation is conducted at a temperature within the range of about 25° C. to about 200° C. and preferably within the range of about 50° C. to about 150° C. The exact choice of temperature in any given instance is a function of the hydrogen pressure employed. The higher the pressure of hydrogen the lower the temperature, within the above limits, which needs to be employed to attain an appropriate rate of hydrogenation.

The hydrogen pressure employed in the process of the invention can vary from about 1 atmosphere to about 100 atmospheres but is preferably within the range of about 3 atmospheres to about 20 atmospheres. These pressures are substantially lower than those permissible with the prior art ruthenium catalyzed hydrogenation of di(4-aminophenyl)methane.

The progress of the hydrogenation is followed readily by observation of the amount of hydrogen taken up by the reaction mixture and the hydrogenation is terminated at the point at which the theoretical quantity of hydrogen has been absorbed. The catalyst is then separated from the solution of reduced material and the latter is treated, as by evaporation and like procedures followed by recrystallization and like purification procedures, to isolate the di(4-aminocyclohexyl)methane therefrom.

It is found that the recoverd catalyst can be re-used a plurality of times in the hydrogenation of subsequent batches of starting diamine. Further, if the catalyst shows signs of losing activity it can be regenerated in a very simple manner by washing with hot (60–80° C.) acetic acid (aqueous or glacial), water or aqueous ammonium hydroxide. The latter is the preferred reagent for rejuvenation of catalyst.

As set forth above the improved process of the invention has the advantage of enabling the use of lower hydrogenation pressures and temperatures than hitherto possible in this particular hydrogenation. Alternatively, when conducted at the higher pressure and temperatures currently used in the art, the use of the novel catalyst in accordance with the present process enables the hydrogenation to be completed in a much shorter time. Further the catalyst can be recovered and re-used repeatedly in the process of this invention enabling the process to be employed on a semicontinuous basis. In marked contrast the catalysts hitherto employed in the art could not be reused in any convenient manner without extensive rejuvenation treatment. Finally, the material produced in accordance with the process of the present invention is completely free of material containing unreduced aromatic rings whereas that obtained using catalysts of the prior art is generally contaminated with such unwanted by-products.

The di(4-aminocyclohexyl)methane obtained in accordance with the process of this invention is useful for all purposes for which this material is conventionally used in the art; see U.S. Pat. 2,494,563. Further, said di(4-aminocyclohexyl)methane produced in accordance with the process of the invention is a mixture of cis,cis-isomer, cis,trans-isomer, and trans,trans-isomer which can be separated into its individual components by procedures well-known in the art; see, for example, U.S. Pat. 2,494,563, supra.

Although the process of the invention has been described in its application to the hydrogenation of substantially pure di(4-aminophenyl)methane it is to be understood that it can be applied to mixtures of polyamines which contain the diamine as principal component the other components of the mixture being triamines, tetramines and higher polymeric methylene bridged polyphenyl polyamines. Such mixtures are generally obtained by the acid condensation of aniline and formaldehyde; see, for example, U.S. Pats. 3,260,751; 2,683,730; and 2,950,-263. The product obtained in such a hydrogenation is the desired di(4-aminocyclohexyl)methane in admixture with the corresponding fully hydrogenated higher polyamines.

The following examples describe the manner and process of making and using the invention and set forth the best mode contemplated by the inventors of carrying out the invention but are not to be construed as limiting.

EXAMPLE 1

This example shows a series of hydrogenations conducted at elevated temperatures (above 100° C.) and relatively high pressures.

A mixture of 39.6 g. (0.20 mole) of di(4-aminophenyl)methane, 400 ml. of isopropyl alcohol, and 12 g. of a 5% rhodium-on-alumina catalyst (Engelhard Industries) was placed in a 1000 ml. stainless steel autoclave fitted with agitator and temperature control. The hydrogenator was then vented and repeatedly pressured with hydrogen to 100 p.s.i.g. to replace all air in the hydrogenator. After purging the last traces of air in this manner the hydrogenator was pressured to 110 p.s.i.g. with hydrogen and maintained at 117° C. with agitation until the theoretical volume of hydrogen had been absorbed (approximately 149 minutes). At the end of this time the reaction mixture was cooled, vented and discharged from the autoclave. The catalyst was removed by filtration, washed with isopropanol and treated as described below. The filtrate and washings were evaporated to dryness to yield 42 g. (100% theoretical yield) of di(4-aminocyclohexyl)methane found by vapor phase chromatography (using appropriate internal standards) to be substantially pure material containing no detectable amounts of aromatic material or deaminated product.

The catalyst recovered from the above hydrogenation was treated for short periods with two successive portions, each of 40 ml., of aqueous ammonium hydroxide (conc. ammonia solution diluted with 3 parts of water) at 60–75° C. The treated catalyst was then dried at 90° C. for 1 hour (weight after drying: 11.3 g.) before being re-used in an exact replica (Run 2) of the procedure described above (Run 1).

The catalyst from this second run was recovered and used in a third run (Run 3); the recovery process was repeated a total of 6 times. The experimental details of the various runs and yield of product are set forth below in Table 1. The abbreviations "MDA" and "H$_{12}$MDA" denote the starting material and end product, respectively.

TABLE 1

| Run No. | MDA (moles) | Reaction time (min.) | Temperature (° C.) | Wt. of catalyst (g.) | H₁₂MDA percent yield (VPC) |
|---|---|---|---|---|---|
| 1 | 0.2 | 149 | 117 | 12 | 100 |
| 2 | 0.188 | 180 | 118 | 11.3 | 92.2 |
| 3 | 0.177 | 140 | 120 | 10.5 | 94.1 |
| 4 | 0.167 | 135 | 110 | ¹ 10.0 | 79.7 |
| 5 | 0.160 | 130 | 110 | ¹ 9.7 | 80.4 |
| 6 | 0.200 | 110 | 120 | ² 12.0 | 91.0 |
| 7 | 0.200 | 335 | 125 | 7.9 | 77.1 |

¹ Recovered catalyst treated with hot (60–75° C.) water for two fifteen minute periods each in place of ammonium hydroxide, followed by oven drying at 90° C.
² Catalyst was a combination of 9.2 g. material recovered from Run 5 and 3.8 g. from a previous unrelated run.

EXAMPLE 2

This example shows a series of hydrogenations conducted at relatively low (50–70° C.) temperatures and pressures (50 p.s.i.g.).

A mixture of 27.1 g. (0.1 mole) of di(4-aminophenyl) methane dihydrochloride, 200 ml. of water and 6 g. of a 5% rhodium-on-alumina catalyst (Engelhard Industries) was placed in 500 ml. Parr low pressure hydrogenator with a shaking speed of 255 r.p.m. The hydrogenator was closed and pressured to 50 p.s.i.g. with nitrogen, pressure tested and heated to 70° C. The hydrogenator was then vented and repeatedly pressurized with hydrogen to 50 p.s.i.g. to replace all air in the hydrogenator. After purging the last traces of air in this manner the hydrogenator was pressured to 50 p.s.i.g. with hydrogen and maintained at 60 to 65° C. with shaking until the theoretical amount of hydrogen had been absorbed. A total of 32.6 hrs. was required to reach this point. The reaction mixture was then cooled, vented, and discharged from the hydrogenator. The catalyst was removed by filtration. The filtrate was neutralized with 25 percent ammonium hydroxide and extracted with chloroform. The combined chloroform extracts were evaporated to dryness to yield 18.5 g. of yellow residues. This material was found by vapor phase chromatography to contain 14.2 g. (a 67.6 percent theoretical yield) of di(4-aminocyclohexyl)methane.

The above procedure was repeated exactly as described with the exception that the rhodium-on-alumina catalyst was replaced by an equal weight of a 5% ruthenium-on-alumina catalyst. No hydrogen was taken up during 19 hrs. of the hydrogenation and the di(4-aminophenyl)methane starting material was recovered unchanged.

Similarly the procedure described above was repeated exactly with the exception that the rhodium-on-alumina catalyst was replaced by an equal weight of a 5% palladium-on-charcoal catalyst. A small quantity of hydrogen was taken up during 7.6 hrs. of hydrogenation. The material isolated from the hydrogenation was a mixture of unchanged di(4-aminophenyl)methane starting material and products of a tarry nature.

EXAMPLE 3

Using the procedure described in Example 2 and employing the same 5% rhodium-on-alumina catalyst but replacing the di(4-aminophenyl)methane dihydrochloride by an equivalent amount of the free diamine and employing isopropyl alcohol as solvent, there was obtained 16.2 g. (77.2% theoretical yield) of distilled di(4-aminocyclohexyl)methane free from contamination by aromatic ring components.

EXAMPLE 4

The hydrogenation procedure described in Example 1 was repeated exactly with the sole exception that the catalyst employed was a 5% rhodium-on-alumina catalyst which had been recovered from a previous run and, after washing with isopropyl alcohol to remove amine, had been triturated with two successive portions of glacial acetic acid at 60° C. for 15 minutes (with each portion) and then dried at 90° C. for 1 hr. before re-use. At the end of the hydrogenation (Run 204–17) with this catalyst, the latter was recovered and treated with glacial acid as described above (temperature of treatment 80° C.) before being used in a second hydrogenation run (Run 204–19). At the end of this run the catalyst was recovered, regenerated with glacial acetic acid and re-used (Run 204–21). The details of these three runs are summarized in the following table, the yield in each case being that calculated on the basis of VPC analysis of the reaction product.

| Run No. | MDA (mole) | Reaction Time (hrs.) | Temperature (°C.) | Hydrogen pressure (p.s.i.g.) | H₁₂MDA yield (percent) |
|---|---|---|---|---|---|
| 204–17 | 0.2 | 8.0 | 85 | 75–125 | 55 |
| 204–19 | 0.2 | 5.6 | 95 | 100–140 | 59.8 |
| 204–21 | 0.2 | 4.0 | 90 | 250–300 | 73.8 |

We claim:
1. In a process for the catalytic hydrogentaion of di-(4-aminophenyl)methane to di(4-aminocyclohexyl)methane the improvement which comprises employing a supported rhodium catalyst, and carrying out the hydrogenation under a hydrogen pressure of from about 3 atmospheres to about 20 atmospheres in the presence of isopropyl alcohol.

2. The process of claim 1 wherein the supported rhodium catalyst is a rhodium-on-alumina catalyst wherein the rhodium content is from about 1% to about 20% by weight.

3. The process of claim 1 wherein the hydrogenation is carried out at a temperature of about 25° C. to about 200° C.

4. A semicontinuous process for the catalytic hydrogenation of di(4-aminophenyl)methane to di(4-aminocyohexyl)methane which process comprises hydrogenating di(4-aminophenyl)methane in the presence of a supported rhodium catalyst, isopropyl alcohol, and hydrogen under pressure of from about 3 atmospheres to about 20 atmospheres, separating the catalyst from the resultant solution of di(4-aminocyclohexyl)methane, subjecting the separated catalyst to treatment with aqueous ammonium hydroxide at approximately 60° C. to 80° C., drying the so treated catalyst, and reusing same as the catalyst in a subsequent hydrogenation of di(4-aminophenyl)methane.

5. The process of claim 4 wherein the supported rhodium catalyst is a rhodium-on-alumina catalyst wherein the rhodium content is from about 1% to about 20% by weight.

6. The process of claim 4 wherein the hydrogenation is carried out at a temperature of about 25° C. to about 200° C.

7. A semicontinuous process for the catalytic hydrogenation of di(4-aminophenyl)methane to di(4-aminocyclohexyl)methane which process comprises hydrogenating di(4-aminophenyl)methane in the presence of a supported rhodium catalyst, isopropyl alcohol, and hydrogen under pressure of about 3 atmospheres to about 20 atmospheres, separating the catalyst from the resultant solution of di-(4-aminocyclohexyl)methane, subjecting the separated catalyst to treatment with water at a temperature within the range of about 60 to 80° C., drying the so treated catalyst, and reusing same as the catalyst in a subsequent hydrogenation of di(4-aminophenyl)methane.

8. The process of claim 7 wherein the supported rhodium catalyst is a rhodium-on-alumina catalyst wherein the rhodium content is from about 1% to about 20% by weight.

9. The process of claim 7 wherein the hydrogenation is carried out at a temperature of about 25° C. to about 200° C.

10. A semicontinuous process for the catalytic hydrogenation of di(4-aminophenyl)methane to di(4-aminocyclohexyl)methane which process comprises hydrogenating the di(4-aminophenyl)methane in the presence of a supported rhodium catalyst, isopropyl alcohol, and hydrogen under pressure of about 3 atmospheres, to about 20 atmospheres, separating the catalyst from the resultant solution of di(4-aminocyclohexyl)methane, subjecting the separated catalyst to treatment with acetic acid at a temperature within the range of about 60 to 80° C., drying the so treated catalyst and reusing the same as the catalyst in a subsequent hydrogenation of di(4-aminophenyl)methane.

11. The process of claim 10 wherein the supported rhodium catalyst is a rhodium-on-alumina catalyst wherein the rhodium content is from about 1% to about 20% by weight.

12. The process of claim 10 wherein the hydrogenation is carried out at a temperature of about 25° C. to 200° C.

References Cited

UNITED STATES PATENTS 3,283,002  11/1966  Brake _____ 260—563

FOREIGN PATENTS 1,118,777  1961  Germany _____ 260—563
989,322  1965  Great Britain _____ 260—563

OTHER REFERENCES

Barkdoll et al.: "J. Amer. Chem. Soc.," vol. 75, pp. 1156–59 (1953).

CHARLES B. PARKER, Primary Examiner

D. R. PHILLIPS, Assistant Examiner

U.S. Cl. X.R.

252—413, 420; 260—563D